(12) United States Patent
Davila

(10) Patent No.: US 12,213,568 B2
(45) Date of Patent: Feb. 4, 2025

(54) MOTORIZED TELESCOPIC UMBRELLA ATTACHMENT DEVICE

(71) Applicant: David Davila, Huntington Beach, CA (US)

(72) Inventor: David Davila, Huntington Beach, CA (US)

( * ) Notice: Subject to any disclaimer, the term of this patent is extended or adjusted under 35 U.S.C. 154(b) by 317 days.

(21) Appl. No.: 17/881,147

(22) Filed: Aug. 4, 2022

(65) Prior Publication Data

US 2024/0041171 A1    Feb. 8, 2024

(51) Int. Cl.
| | | |
|---|---|---|
| A45B 11/00 | (2006.01) | |
| A45B 25/00 | (2006.01) | |
| A45B 25/16 | (2006.01) | |
| H01M 10/46 | (2006.01) | |
| H01M 50/202 | (2021.01) | |
| H01M 50/247 | (2021.01) | |
| H04R 1/02 | (2006.01) | |
| H04W 4/80 | (2018.01) | |

(52) U.S. Cl.
CPC ............ *A45B 25/165* (2013.01); *A45B 11/00* (2013.01); *A45B 25/006* (2013.01); *H01M 10/46* (2013.01); *H01M 50/202* (2021.01); *H01M 50/247* (2021.01); *H04R 1/025* (2013.01); *A45B 2200/1009* (2013.01); *H01M 2220/30* (2013.01); *H04W 4/80* (2018.02)

(58) Field of Classification Search
CPC .. A45B 11/00; B25B 5/02; B25B 5/06; B25B 5/068
See application file for complete search history.

(56) References Cited

U.S. PATENT DOCUMENTS

| | | | | |
|---|---|---|---|---|
| 263,606 | A | * 8/1882 | Smith | A01K 97/10 |
| | | | | 248/514 |
| 2,559,421 | A | * 7/1951 | Garrett | A45B 11/00 |
| | | | | 403/104 |
| D254,971 | S | 5/1980 | Riddle | |
| 4,543,971 | A | * 10/1985 | Sirota | B60J 11/00 |
| | | | | 135/22 |
| 4,603,901 | A | 8/1986 | McIntosh | |
| 4,770,401 | A | * 9/1988 | Donaldson | B25B 1/18 |
| | | | | 269/283 |
| 5,002,329 | A | 3/1991 | Rafi-Zadeh | |
| 5,291,908 | A | * 3/1994 | Grady, II | A45B 25/165 |
| | | | | 135/22 |

(Continued)

FOREIGN PATENT DOCUMENTS

WO    WO2014138605    9/2014

*Primary Examiner* — Noah Chandler Hawk

(57) ABSTRACT

A motorized telescopic umbrella attachment device for opening and closing based on readings from a wind pressure sensor includes a base. The base has an interior that holds a variety of elements including a battery, a charge port, a microprocessor, a Bluetooth receiver, and a speaker. Furthermore, the interior has a gear drive and a motor. A rack of a clamp is in mechanical communication with the gear drive whereby the motion of the gear drive moves the clamp. The clamp attaches to a vehicle tailgate. A shaft extends out when the gear drive is in motion. A pole is nested within the shaft. A canopy is at an end of the pole. A plurality of telescopic arms helps to extend the canopy to an open position when the shaft extends out. The shaft has a sensor to retract when the wind expels high pressure.

19 Claims, 6 Drawing Sheets

(56) References Cited

U.S. PATENT DOCUMENTS

| | | | | |
|---|---|---|---|---|
| 5,397,268 A | * | 3/1995 | Chang | F24F 7/065 |
| | | | | 454/370 |
| 5,423,587 A | | 6/1995 | Ingram | |
| 5,892,344 A | * | 4/1999 | Cooley | B25B 5/061 |
| | | | | 24/456 |
| 6,030,026 A | | 2/2000 | Vega | |
| 6,340,154 B1 | * | 1/2002 | Young | B25B 5/06 |
| | | | | 254/3 R |
| 6,405,742 B1 | * | 6/2002 | Driscoll | A45B 17/00 |
| | | | | 135/42 |
| 6,637,793 B2 | | 10/2003 | Krause | |
| 7,059,660 B1 | | 6/2006 | Juola | |
| 7,069,939 B1 | * | 7/2006 | Conde | A45B 25/00 |
| | | | | 135/25.41 |
| 8,820,336 B1 | * | 9/2014 | Schneberger | A45B 11/00 |
| | | | | 135/20.1 |
| 9,326,573 B1 | * | 5/2016 | Harris | A45B 11/00 |
| 2012/0168598 A1 | * | 7/2012 | Walker | B60R 7/12 |
| | | | | 248/539 |
| 2021/0235827 A1 | * | 8/2021 | Clarke | A45B 25/00 |

* cited by examiner

MOTORIZED TELESCOPIC UMBRELLA ATTACHMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to canopy vehicle-attachment assemblies and more particularly pertains to a new canopy vehicle-attachment assembly for opening and closing based on readings from a wind pressure sensor.

(2) Description of Related Art Including Information Disclosed Under 37 CFR 1.97 and 1.98

The prior art relates to canopy vehicle-attachment assemblies. Known prior art includes a variety of canopy vehicle-attachment assemblies having an adjustable height for the canopy relative to the vehicle. Known prior art lacks a canopy vehicle-attachment assembly configured for the canopy being a deployable umbrella and having a wind pressure sensor.

BRIEF SUMMARY OF THE INVENTION

An embodiment of the disclosure meets the needs presented above by generally comprising a base. The base has a top surface and a bottom surface. The base has an interior where the interior defines a space for a variety of elements to be positioned within. The interior comprises a battery and a charge port. The charge port is in electric communication with the battery. The charge port is configured for coupling to an outlet whereby sending electric current to the battery. A microprocessor is in electric communication with the battery. A Bluetooth receiver is in electric communication with the microprocessor. The Bluetooth receiver is configured for communication with a Bluetooth transmitter. A speaker is in electric communication with the Bluetooth receiver and with the microprocessor. A gear drive is a variety of gears where each gear of said variety of gears is in mechanical communication with each other. The gear drive is configured for providing motion to a variety of elements. A motor is coupled to the gear drive. The motor is in electric communication with the battery and with the microprocessor. The motor is configured for activating the gear drive. Furthermore, a base of a clamp has a top surface. A rack is coupled to the top surface of the base of the clamp and the rack is inserted into an opening on the bottom surface of the base. The rack is in mechanical communication with the gear drive. A shaft is a telescopic shaft with an interior. The interior defines a space for an adjustment mechanism to be positioned within. A canopy is a parasol with a plurality of telescopic arms. Each of the telescopic arms is configured for extending the canopy into an open and closed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
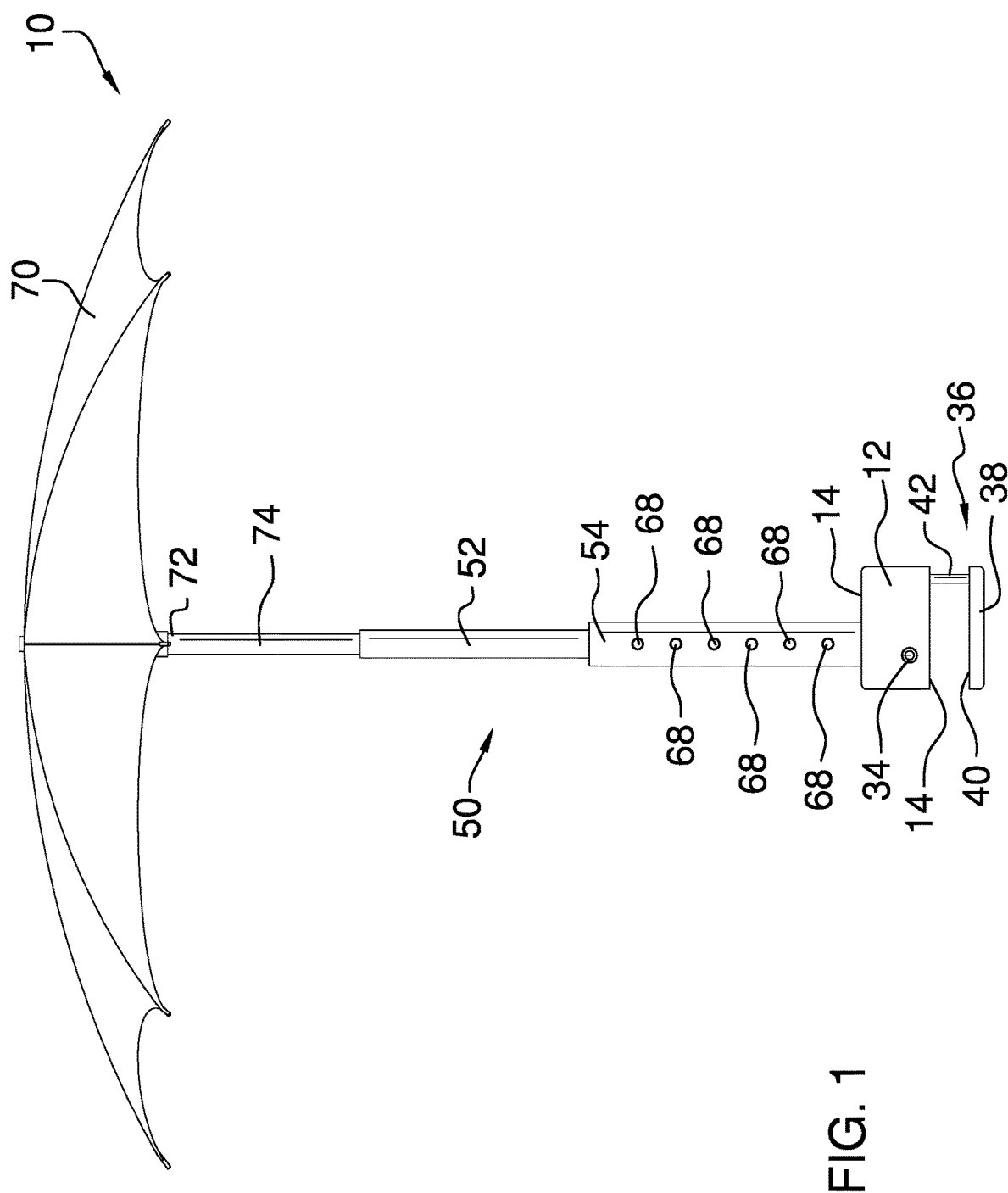
FIG. 1 is a front view of a motorized telescopic umbrella attachment device according to an embodiment of the disclosure in an extended position.
Figure 2:
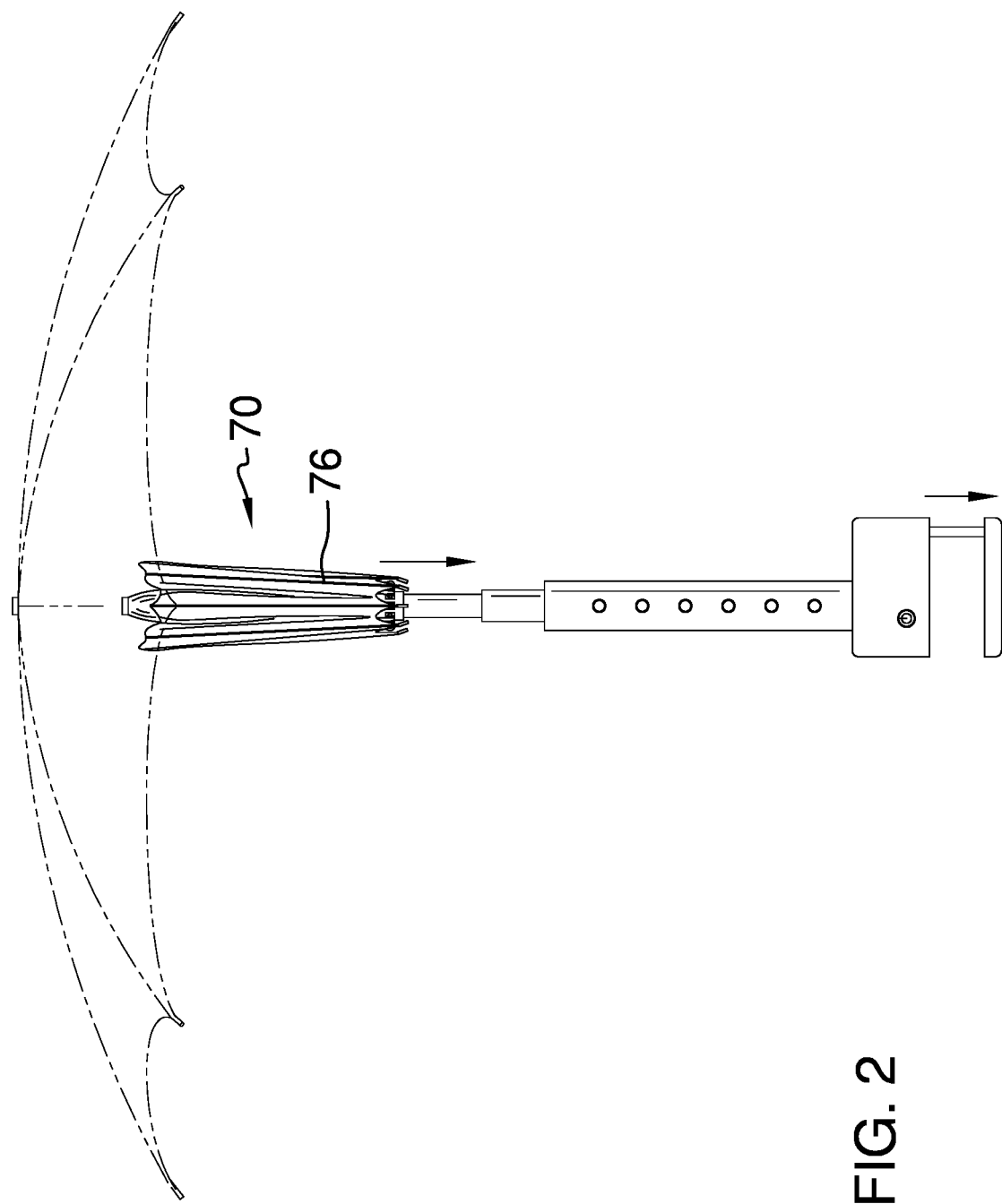
FIG. 2 is a front view of an embodiment of the disclosure being retracted.
Figure 3:
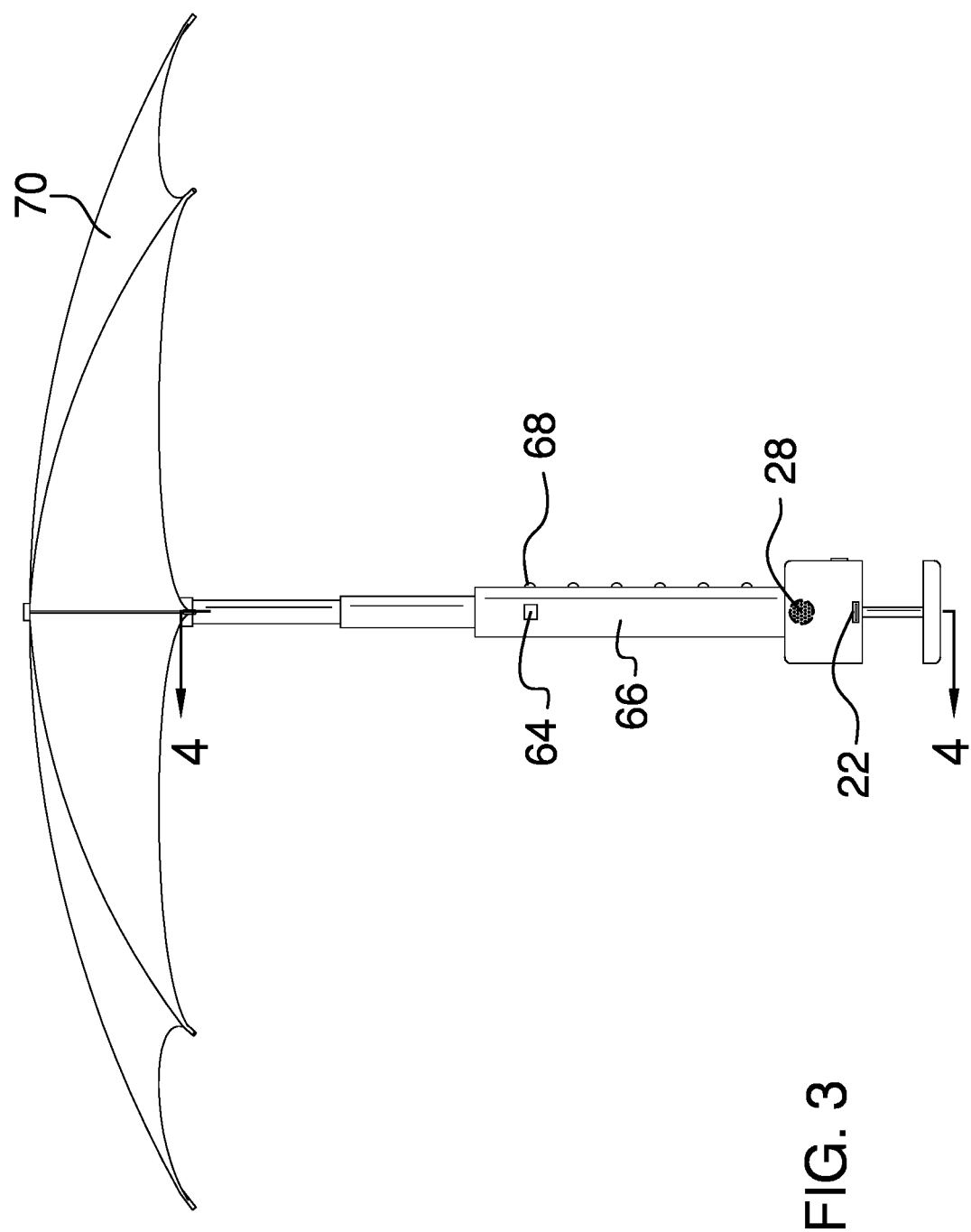
FIG. 3 is a side view of an embodiment of the disclosure in a partially extended position.

With reference now to the drawings, and in particular to FIGS. 1 through 6 thereof, a new canopy vehicle-attachment assembly embodying the principles and concepts of an embodiment of the disclosure and generally designated by the reference numeral 10 will be described.

Figure 4:
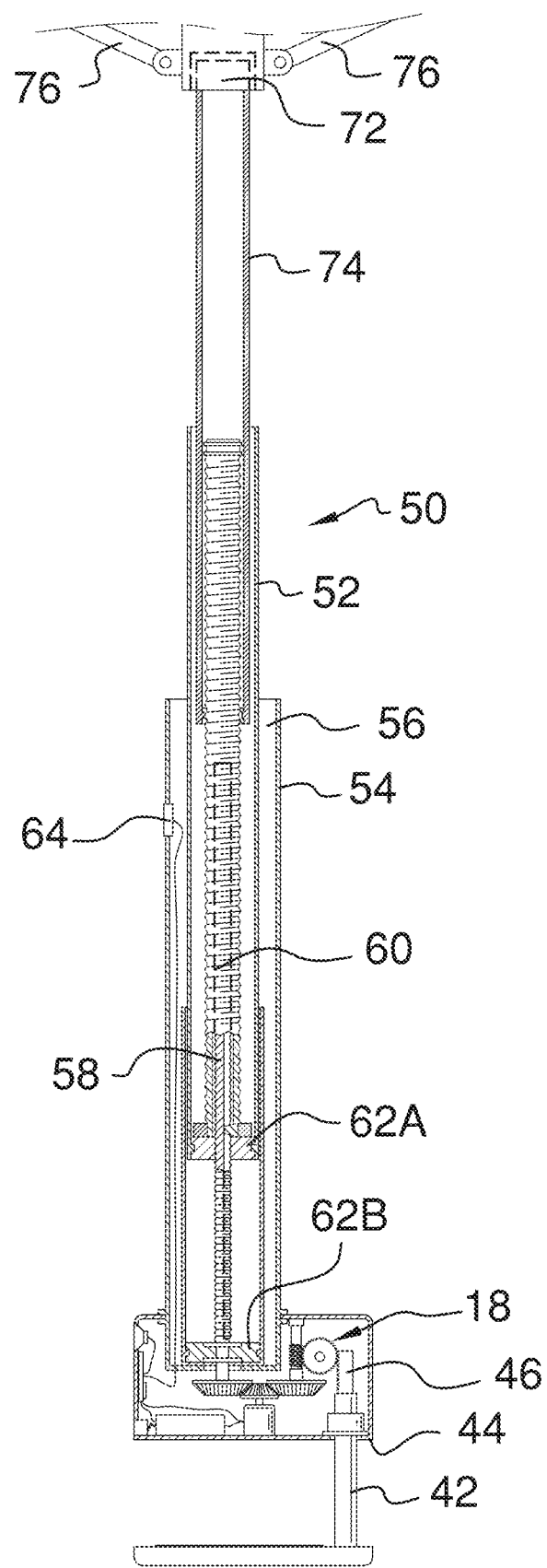
FIG. 4 is a cross-sectional view of an embodiment of the disclosure.
Figure 5:
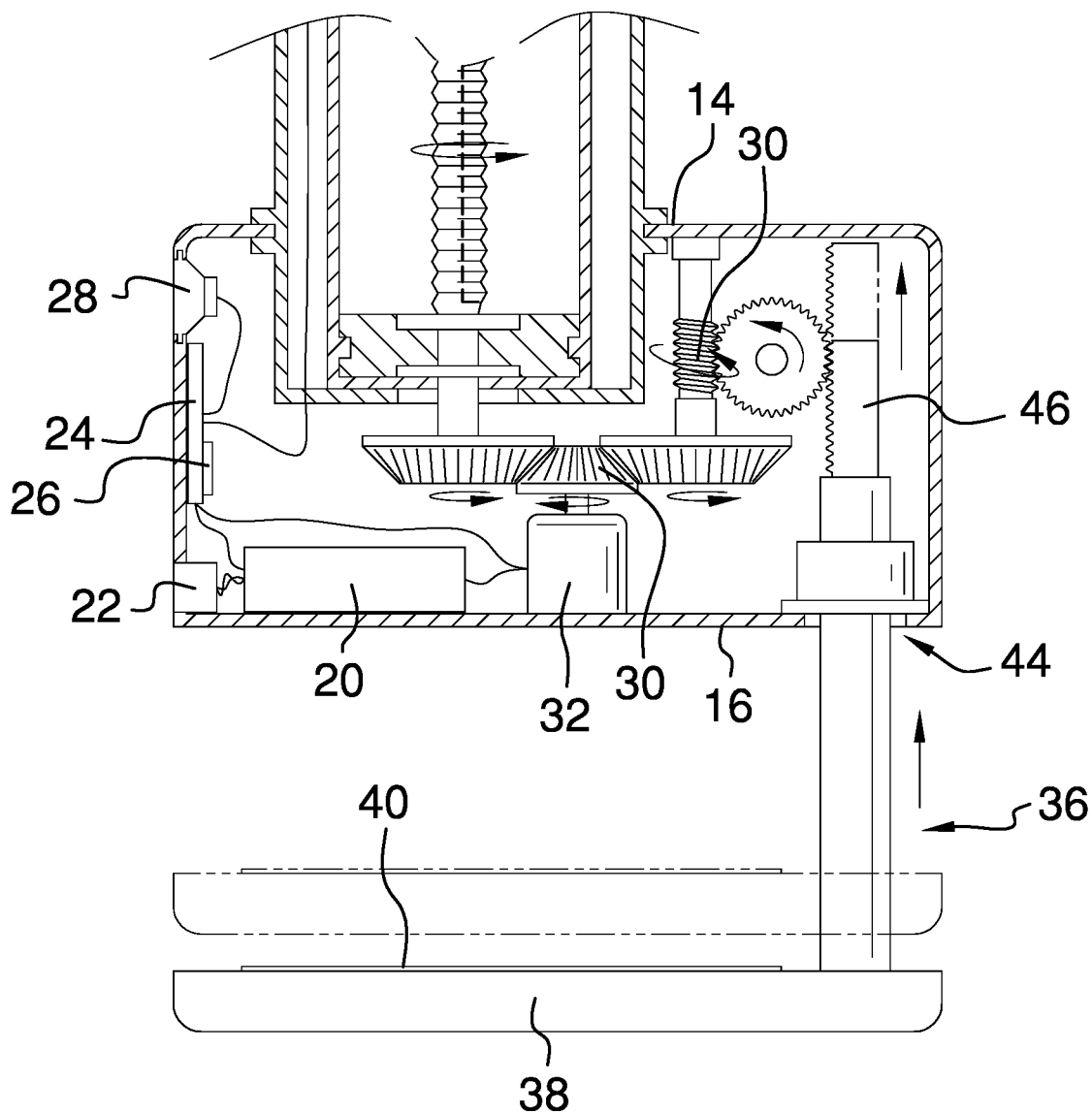
FIG. 5 is a detail view of an embodiment of the disclosure.
Figure 6:
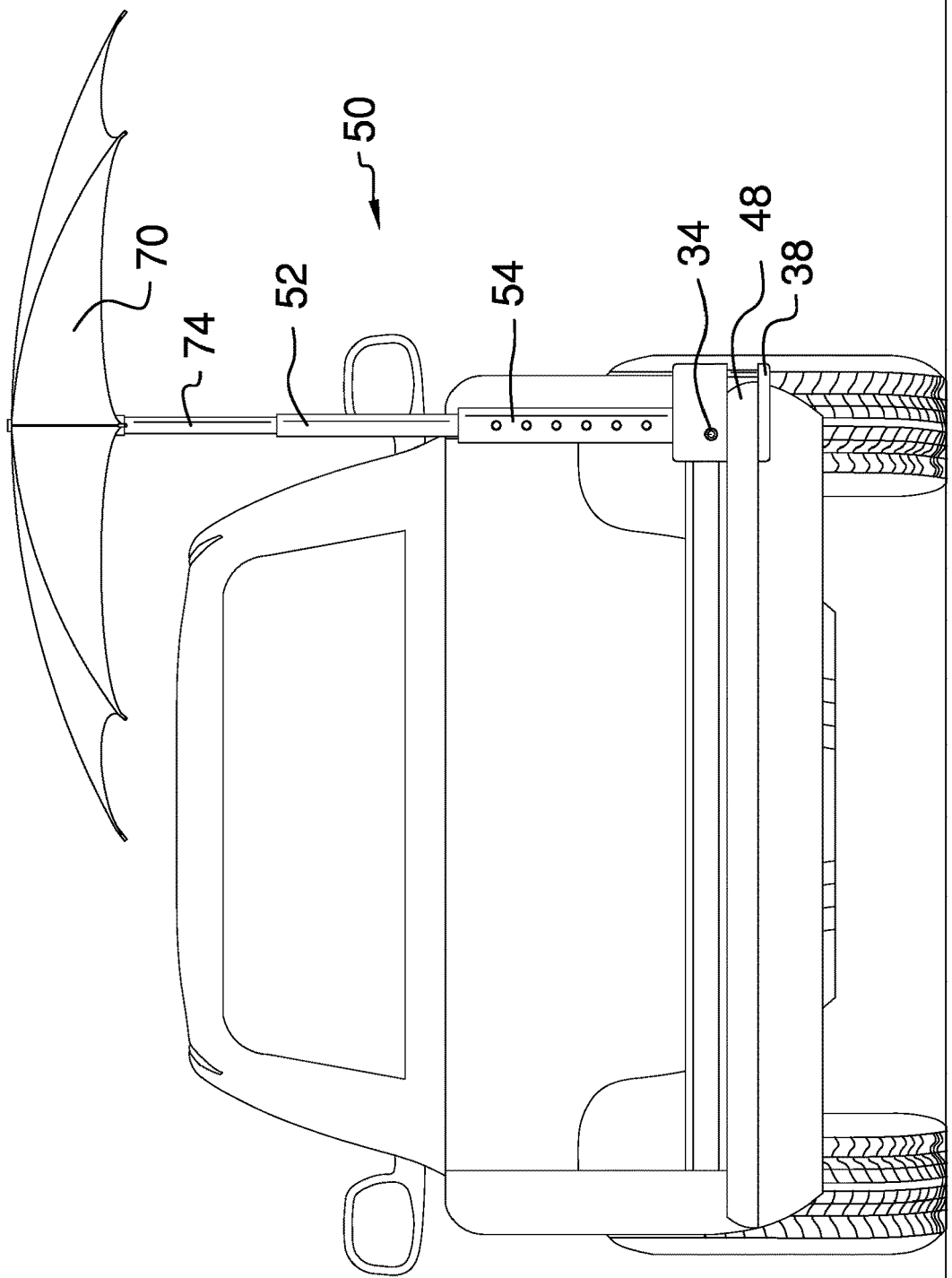
FIG. 6 is an in-use view of an embodiment of the disclosure.

As best illustrated in FIGS. 1 through 6, the motorized telescopic umbrella attachment device 10 generally comprises a base 12. The base 12 is a rectangular prism shape. The base 12 has a top surface 14 and a bottom surface 16. Furthermore, the base 12 has an interior 18 as shown in FIG. 4 and FIG. 5. The interior 18 defines a space for a variety of elements to be positioned within. The interior 18 comprises a battery 20. The battery 20 is rechargeable and is a lithium material. The battery 20 is in electric communication with a charge port 22. The charge port 22 is configured for coupling to an outlet whereby sending electric current to the battery 20.

The interior 18 further comprises a microprocessor 24. The microprocessor 24 is a central processing unit. The microprocessor 24 is in electric communication with the battery 20, whereby the battery 20 sends electric current to power the microprocessor 24. A Bluetooth receiver 26 is in electric communication with the microprocessor 24. The Bluetooth receiver 26 is configured for being in communication with a Bluetooth transmitter. The Bluetooth receiver 26 obtains commands that are sent to the microprocessor 24. A speaker 28 is in electric communication with the Bluetooth receiver 26 and with the microprocessor 24. The speaker 28 is an audio player and is configured for playing audio sent to the Bluetooth receiver 26.

A gear drive 30 is a variety of gears. The variety of gears is configured for including a spur gear, a helical gear, a bevel gear, and a worm gear. Each of the gears 30 is in mechanical communication whereby motion is uniform in the gear drive 30 with each other. The gear drive 30 is configured for providing motion to a variety of elements within the interior 18 of the base 12. A motor 32 is coupled to the gear drive 30. The motor 32 can initiate or stop the motion of the gear drive 30. The motor 32 is in electric communication with the battery 20 and with the microprocessor 24. The battery 20 sends electric current to power the motor 32. The microprocessor 24 can turn the motor 32 on and off. An actuator 34 is in electric communication with the motor 32 and is configured for starting or stopping the motor 32 from running.

A clamp 36 has a base 38 as shown in FIG. 5. The base 38 has a top surface 40 where a rack 42 is positioned on. The rack 42 protrudes into an opening 44 on the bottom surface 16 of the base 12. An end 46 of the rack 42 has threading and is configured for being in mechanical communication with the gear drive 30. When the gear drive 30 is in motion, the rack 42 moves either up or down, whereby moving the clamp 36 up and down. The clamp 36 is used to secure the base 12 to a variety of elements including a vehicle tailgate 48, a vehicle rack, a vehicle bumper, or a picnic table.

A shaft 50 is positioned on the top surface 14 of the base 12. The shaft 50 is a telescopic shaft and is configured for extending its length. The shaft 50 has a first section 52 and a second section 54. The first section 52 is nested within the second section 54, and the second section 54 remains in a fixed position relative to the first position 52. The first section 52 and the second section 54 have tubular bodies. The shaft 50 has an interior 56. The interior 56 of the shaft 50 defines a space for an adjustment mechanism 58 to be positioned within. The adjustment mechanism 58 comprises a rod 60 and a pair of bearings 62. Each of the bearings 62 is positioned around the rod 58. The rod 58 has threading and each of the bearings 62 has threading, thus the rod 58 and the pair of bearings 62 are complementary to each other. A first bearing 62A of the pair of bearings 62 is coupled to the first section 52, and a second bearing 62B of the pair of bearings 62 is coupled to the second section 54. The rod 60 is in mechanical communication with the gear drive 30, whereby the rod 60 is configured for rotation when the gear drive 30 is in motion. When the rod 60 rotates, the first bearing 62A moves along the rod 60 thus adjusting the positioning of the first section 52 relative to the second section 54.

The adjustment mechanism 58 has a sensor 64. The sensor 64 is a wind pressure sensor and is configured for measuring the wind. The sensor 64 is positioned on a side 66 of the second section 54 of the shaft 50. The sensor 64 is in electric communication with the microprocessor 24. The sensor 64 will send signals to the microprocessor 24 regarding wind readings, and the microprocessor 24 can run the motor 32 depending on the level of wind. Additionally, light emitting diodes 68 can be positioned on the side 66 of the second section 54 of the shaft 50 and emit light when the shaft 50 is extended.

A canopy 70 is a stretchable parasol having a liquid resistant material. The canopy 70 is coupled to an end 72 of a pole 74. The pole 74 is nested within the first section 52 of the shaft 50. The first section 52 of the shaft 50 remains in a fixed position relative to the pole 74. The canopy 70 has a plurality of telescopic arms 76. Each of the telescopic arms 76 is configured for extending the canopy 70 into an open and closed position. Each of the telescopic arms 76 is coupled to the first section 52 of the shaft 50. The canopy 70 is configured for extending into an open position when the first section 52 extends out from the second section 54. The canopy 70 is configured for retracting into a closed position when the sensor 64 detects high pressure of wind. When in an open position, the canopy 70 provides protection from sunlight and from rain.

In use, the user activates the motor 32 to lower the rack 42 of the clamp 36. The user then positions the bottom surface 16 of the base 12 on a top of the vehicle tailgate 48. The user then runs the motor 32 to lift the rack 42 of the clamp 36 until the top surface 40 of the base 38 of the clamp 36 presses against a bottom of the vehicle tailgate 48, thus fastening the base 12 of the motorized umbrella attachment device 10 to the vehicle tailgate 48. The user can then start the motor 32 to extend the shaft 50, thus opening the canopy 70 to either provide shade from sunlight or protection from rain. Additionally, the user can play music from the speaker 28 by sending music commands to the Bluetooth receiver 26 from a Bluetooth transmitter of a mobile device. The sensor 64 of the shaft 50 will send its wind readings to the microprocessor 24, and the microprocessor 24 will run the motor 32 to close the canopy 70 when the wind pressure raises above a set maximum wind reading.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. An automated umbrella assembly comprising:
a base, said base having a top surface and a bottom surface, said base having an interior, said interior defining a space for a variety of elements to be positioned within, said interior comprising:
a battery;
a charge port, said charge port being in electric communication with said battery, said charge port being configured for coupling to an outlet whereby sending electric current to said battery;
a microprocessor, said microprocessor being in electric communication with said battery;
a Bluetooth receiver, said Bluetooth receiver being in electric communication with said microprocessor, said Bluetooth receiver being configured for communication with a Bluetooth transmitter;
a speaker, said speaker being in electric communication with said Bluetooth receiver and with said microprocessor;
a gear drive, said gear drive being a variety of gears, each gear of said variety of gears being in mechanical communication with each other, said gear drive being configured for providing motion to a variety of elements; and
a motor, said motor being coupled to said gear drive, said motor being in electric communication with said battery and with said microprocessor, said motor being configured for activating said gear drive; and
a clamp, said clamp having a clamp base, said clamp base having a top surface, a rack being positioned on said top surface, said rack being inserted into an opening on said bottom surface of said base, said rack being in mechanical communication with said gear drive;
a shaft, said shaft being a telescopic shaft, said shaft having an interior, said interior defining a space for an adjustment mechanism to be positioned within; and
a canopy, said canopy being a parasol, said canopy having a plurality of telescopic arms, each of said telescopic arms being configured for extending said canopy into an open and closed position.

2. The automated umbrella assembly of claim 1, further comprising said base being a rectangular prism shape.

3. The automated umbrella assembly of claim 1, further comprising said battery being rechargeable.

4. The automated umbrella assembly of claim 3, further comprising said battery being lithium material.

5. The automated umbrella assembly of claim 1, further comprising said microprocessor being a central processing unit.

6. The automated umbrella assembly of claim 1, further comprising said speaker being an audio player, said speaker being positioned on a wall of said base.

7. The automated umbrella assembly of claim 1, further comprising an actuator, said actuator being in electric communication with said motor, said actuator being configured for starting or stopping said motor from running.

8. The automated umbrella assembly of claim 1, further comprising said rack being configured for providing longitudinal motion to said clamp.

9. The automated umbrella assembly of claim 1, further comprising said shaft having a first section and a second section.

10. The automated umbrella assembly of claim 1, further comprising said first section nested within said second section, said first section and said second section being having a tubular body.

11. The automated umbrella assembly of claim 10, further comprising said adjustment mechanism being a rod having a pair of bearings, a first bearing of said pair of bearings being coupled to said first section, said rod being configured for rotating whereby moving said first bearing thus moving said first section within said second section.

12. The automated umbrella assembly of claim 11, further comprising said rod having threading, each of said bearings having threading.

13. The automated umbrella assembly of claim 12, further comprising a second bearing of said pair of bearings being coupled to said second section.

14. The automated umbrella assembly of claim 11, further comprising said rod being in mechanical communication with said gear drive.

15. The automated umbrella assembly of claim 10, further comprising each of said telescopic arms being coupled to said first section of said shaft.

16. The automated umbrella assembly of claim 1, further comprising said parasol having a liquid resistant material, said canopy being coupled to an end of a pole, said pole being nested within said first section of said shaft.

17. The automated umbrella assembly of claim 1, further comprising said adjustment mechanism having a sensor, said sensor being a wind pressure sensor, said sensor being configured for measuring wind pressure.

18. The automated umbrella assembly of claim 17, further comprising said canopy being configured for retracting into a closed position when said sensor detects high pressure of wind.

19. An automated umbrella assembly comprising:
a base, said base being a rectangular prism shape, said base having a top surface and a bottom surface, said base having an interior, said interior defining a space for a variety of elements to be positioned within, said interior comprising:
a battery, said battery being rechargeable, said battery being lithium material;
a charge port, said charge port being in electric communication with said battery, said charge port being configured for coupling to an outlet whereby sending electric current to said battery;
a microprocessor, said microprocessor being a central processing unit, said microprocessor being in electric communication with said battery;
a Bluetooth receiver, said Bluetooth receiver being in electric communication with said microprocessor, said Bluetooth receiver being configured for communication with a Bluetooth transmitter;
a speaker, said speaker being an audio player, said speaker being in electric communication with said Bluetooth receiver and with said microprocessor, said speaker being positioned on a wall of said base;
a gear drive, said gear drive being a variety of gears, each gear of said variety of gears being in mechanical communication with each other, said gear drive being configured for providing motion to a variety of elements;
a motor, said motor being coupled to said gear drive, said motor being in electric communication with said battery and with said microprocessor, said motor being configured for activating said gear drive; and
an actuator, said actuator being in electric communication with said motor, said actuator being configured for starting or stopping said motor from running;
a clamp, said clamp having a clamp base, said clamp base having a top surface, a rack being positioned on said top surface, said rack being inserted into an opening on said bottom surface of said clamp base, said rack being in mechanical communication with said gear drive, said rack being configured for providing longitudinal motion to said clamp;

a shaft, said shaft being a telescopic shaft, said shaft having a first section and a second section, said first section nested within said second section, said first section and said second section being having a tubular body, said shaft having an interior, said interior defining a space for an adjustment mechanism to be positioned within, said adjustment mechanism being a rod having a pair of bearings, said rod having threading, each of said bearings having threading, a first bearing of said pair of bearings being coupled to said first section, a second bearing of said pair of bearings being coupled to said second section, said rod being configured for rotating whereby moving said first bearing thus moving said first section within said second section, said rod being in mechanical communication with said gear drive, said adjustment mechanism having a sensor, said sensor being a wind pressure sensor, said sensor being configured for measuring wind pressure; and a canopy, said canopy being a parasol, said parasol having a liquid resistant material, said canopy being coupled to an end of a pole, said pole being nested within said first section of said shaft, said canopy having a plurality of telescopic arms, each of said telescopic arms being configured for extending said canopy into an open and closed position, each of said telescopic arms being coupled to said first section of said shaft, said canopy being configured for extending into an open position, said canopy being configured for retracting into a closed position when said sensor detects high pressure of wind.

* * * * *